United States Patent
Hwang et al.

(10) Patent No.: US 7,593,218 B2
(45) Date of Patent: Sep. 22, 2009

(54) SUPPORTING DEVICE FOR DISPLAY APPARATUS AND DISPLAY APPARATUS HAVING THE SAME

(75) Inventors: Kwang Sung Hwang, Suwon-si (KR); Yong Ha Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 11/954,029

(22) Filed: Dec. 11, 2007

(65) Prior Publication Data

US 2008/0192417 A1 Aug. 14, 2008

(30) Foreign Application Priority Data

Feb. 13, 2007 (KR) ............... 10-2007-0014846

(51) Int. Cl.
*G06F 1/16* (2006.01)

(52) U.S. Cl. ................ 361/679.21; 248/917

(58) Field of Classification Search ........... 361/679.21, 361/679.22; 248/917–924
See application file for complete search history.

(56) References Cited

U.S. PATENT DOCUMENTS 5,842,672 A * 12/1998 Sweere et al. ............ 248/278.1
6,822,857 B2 * 11/2004 Jung et al. ............. 361/679.02
7,014,154 B2 * 3/2006 Jeong et al. ................ 248/157
7,126,815 B2 * 10/2006 Hwang et al. .......... 361/679.06
7,424,994 B2 * 9/2008 Jeong ...................... 248/278.1
2006/0238966 A1 * 10/2006 Sung ........................ 361/681
2007/0152125 A1 * 7/2007 Lee ........................... 248/398
2007/0194182 A1 * 8/2007 Lee ......................... 248/125.9
2007/0210221 A1 * 9/2007 Kim et al. ................ 248/124.1

FOREIGN PATENT DOCUMENTS

CN 1497610 A 5/2004
KR 10-0512719 B1 8/2005

* cited by examiner

*Primary Examiner*—Lisa Lea-Edmonds
(74) *Attorney, Agent, or Firm*—Sughrue Mion, PLLC

(57) ABSTRACT

A supporting device for a display apparatus, including a supporting bracket coupled to the display apparatus, a base, a stand to connect the base to the supporting bracket, and a connector mechanism to rotatably connect the stand to the supporting bracket. The connector mechanism includes a first connecting unit to rotatably connect the stand to the supporting bracket, the first connecting unit having a retainer structure to divide a rotation range of the display apparatus relative to the stand into a screen angle adjusting range and a folding range. The connector mechanism further includes a second connecting unit to rotatably connect the stand to the supporting bracket, the second connecting unit having a frictional structure to provide a rotation-coupling region thereof with a frictional force. The first connecting unit and the second connecting unit are formed as separate assemblies.

20 Claims, 8 Drawing Sheets

SUPPORTING DEVICE FOR DISPLAY APPARATUS AND DISPLAY APPARATUS HAVING THE SAME

CROSS-REFERENCE TO RELATED APPLICATION

This application claims the benefit of Korean Patent Application No. 2007-0014846, filed on Feb. 13, 2007 in the Korean Intellectual Property Office, the disclosure of which is incorporated herein by reference.

BACKGROUND OF THE INVENTION

1. Field of the Invention

The present invention relates to a supporting device for a display apparatus, and, more particularly, to a supporting device for a display apparatus in which a stand is rotatably connected to a body of the display apparatus, and a display apparatus having the same.

2. Description of the Related Art

A display apparatus, such as an LCD or PDP, includes a supporting device to support a body of the display apparatus and to adjust the angle of a body screen. The supporting device is disclosed in Korean Registered Patent Publication No. 10-0512719 (published on Sep. 7, 2005).

The supporting device, disclosed in the above publication, comprises a link member interposed between a monitor body and a base member, a base hinge to rotatably connect one end of the link member to the base member, a monitor hinge to rotatably connect the other end of the link member to the monitor body, and an auxiliary link member to convert a rotating movement of the link member relative to the base member into a rotating movement of the monitor body. In operation of the conventional supporting device, by rotating the base hinge and the monitor hinge, the angle of the monitor body relative to the base member can be appropriately adjusted. Also, the supporting device can be folded to reduce the volume of a package, for the sake of easy storage and carrying.

The monitor hinge of the above described supporting device comprises a frictional structure to provide a rotating shaft with a frictional force for keeping the screen angle of the monitor body in an adjusted state, and a retainer structure for restricting the rotation of the monitor body within an angle adjustment range.

The retainer structure includes a seesaw type stopper supported by a spring. When a user rotates the monitor body beyond the angle adjustment range of the screen, the monitor body is caught by the stopper, so as not to be rotated further. Then, when the user operates the stopper to release the monitor body from the stopper, the monitor body is further rotatable, to allow the supporting device to be folded completely.

However, since the monitor hinge, having the frictional structure and the retainer structure, has a single assembly form, the above described conventional supporting device has a problem of a complicated connection between the monitor body and the link member in the course of manufacture.

Furthermore, the retainer structure has a complicated configuration and tends to cause trouble in use because the user has to manually release the monitor body from the stopper of the retainer structure when it is desired to completely fold the supporting device.

SUMMARY OF THE INVENTION

The present invention has been made in order to solve the above problems. It is an aspect of the invention to provide a supporting device for a display apparatus capable of being assembled easily, and a display apparatus having the same.

It is a further aspect of the invention to provide a supporting device for a display apparatus which can achieve a more simplified retainer structure provided at a connecting region thereof as compared to the prior art and can be folded easily, and a display apparatus having the same.

Additional aspects and/or advantages of the invention will be set forth in part in the description which follows and, in part, will be obvious from the description, or may be learned by practice of the invention.

In accordance with the invention, the above and/or other aspects can be achieved by the provision of a supporting device for a display apparatus, comprising a supporting bracket coupled to the display apparatus, a base, a stand to connect the base to the supporting bracket, and a connector mechanism to rotatably connect the stand to the supporting bracket, wherein the connector mechanism comprises: a first connecting unit to rotatably connect the stand to the supporting bracket, the first connecting unit having a retainer structure to divide a rotation range of the display apparatus relative to the stand into a screen angle adjusting range and a folding range; and a second connecting unit to rotatably connect the stand to the supporting bracket, the second connecting unit having a frictional structure to provide a rotation-coupling region thereof with a frictional force, and wherein the first connecting unit and the second connecting unit take the form of separate assemblies.

The first connecting unit may comprise a first hinge shaft coupled, in a rotation-limited state, to the stand and a first connecting member having one side rotatably coupled to the first hinge shaft and the other side fixed to the supporting bracket, the retainer structure may comprise a first protrusion protruding from a side surface of the first connecting member, a retaining plate coupled, in a rotation-limited state, around an outer surface of the first hinge shaft and having a second protrusion provided at a position corresponding to the first protrusion, and a fastening nut fastened around the outer surface of the first hinge shaft so as to force the retaining plate to be in close contact with the first connecting member.

The retainer structure may further comprise at least one spring washer coupled around the outer surface of the first hinge shaft between the fastening nut and the retaining plate.

The first hinge shaft may comprise a head portion formed at one end thereof for preventing separation of the first connecting member, and a non-circular sectional portion to limit rotation of the retaining plate and the first hinge shaft.

The stand may comprise a shaft coupling portion provided at one side of an upper end of the stand for the coupling of the first hinge shaft, the shaft coupling portion having a non-circular shaft coupling hole.

The first connecting unit may further comprise a torsion spring installed around the outer surface of the first hinge shaft, the torsion spring having one end fixed to the stand and the other end coupled to the first connecting member.

The connector mechanism may further comprise a fixing bracket detachably coupled to an upper end portion of the stand for the installation of the second connecting unit, the second connecting unit may comprise a second hinge shaft coupled, in a rotation-limited state, to the fixing bracket and a second connecting member having one side rotatably coupled to the second hinge shaft and the other side fixed to the supporting bracket, and the frictional structure may comprise a frictional member coupled around the outer surface of the second hinge shaft, the frictional member having elasticity to tighten the outer surface of the second hinge shaft and being coupled, in a rotation-limited state, to the second connecting member.

The second hinge shaft may have a non-circular sectional portion provided at a portion thereof to be coupled to the fixing bracket, and the fixing bracket may have a non-circular shaft coupling hole for the coupling of the second hinge shaft.

The supporting device may further comprise a rotation-limit structure to limit a rotation range of the second connecting member relative to the fixing bracket, the rotation-limit structure may comprise a holding piece protruding from the second connecting member toward the fixed bracket, a first stepped supporting portion provided at a position of the fixing bracket to limit a rotation range of the holding piece in a first direction, and a second stepped supporting portion provided at an opposite position of the fixing bracket to limit a rotation range of the holding piece in a second direction.

The connector mechanism may further comprise fastening screws to connect the first connecting unit and the second connecting unit to each other.

In accordance with another aspect of the invention, there is provided a display apparatus comprising a body having a screen and a supporting device to support the body, wherein the supporting device may comprise a supporting bracket coupled to the body, a base to support the body, a stand to connect the base to the supporting bracket, and a connector mechanism to rotatably connect the stand to the supporting bracket, the connector mechanism may comprises: a first connecting unit to rotatably connect the stand to the supporting bracket, the first connecting unit having a retainer structure to divide a rotation range of the display apparatus relative to the stand into a screen angle adjusting range and a folding range; and a second connecting unit to rotatably connect the stand to the supporting bracket, the second connecting unit having a frictional structure to provide a rotation-coupling region thereof with a frictional force, and the first connecting unit and the second connecting unit may take the form of separate assemblies.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
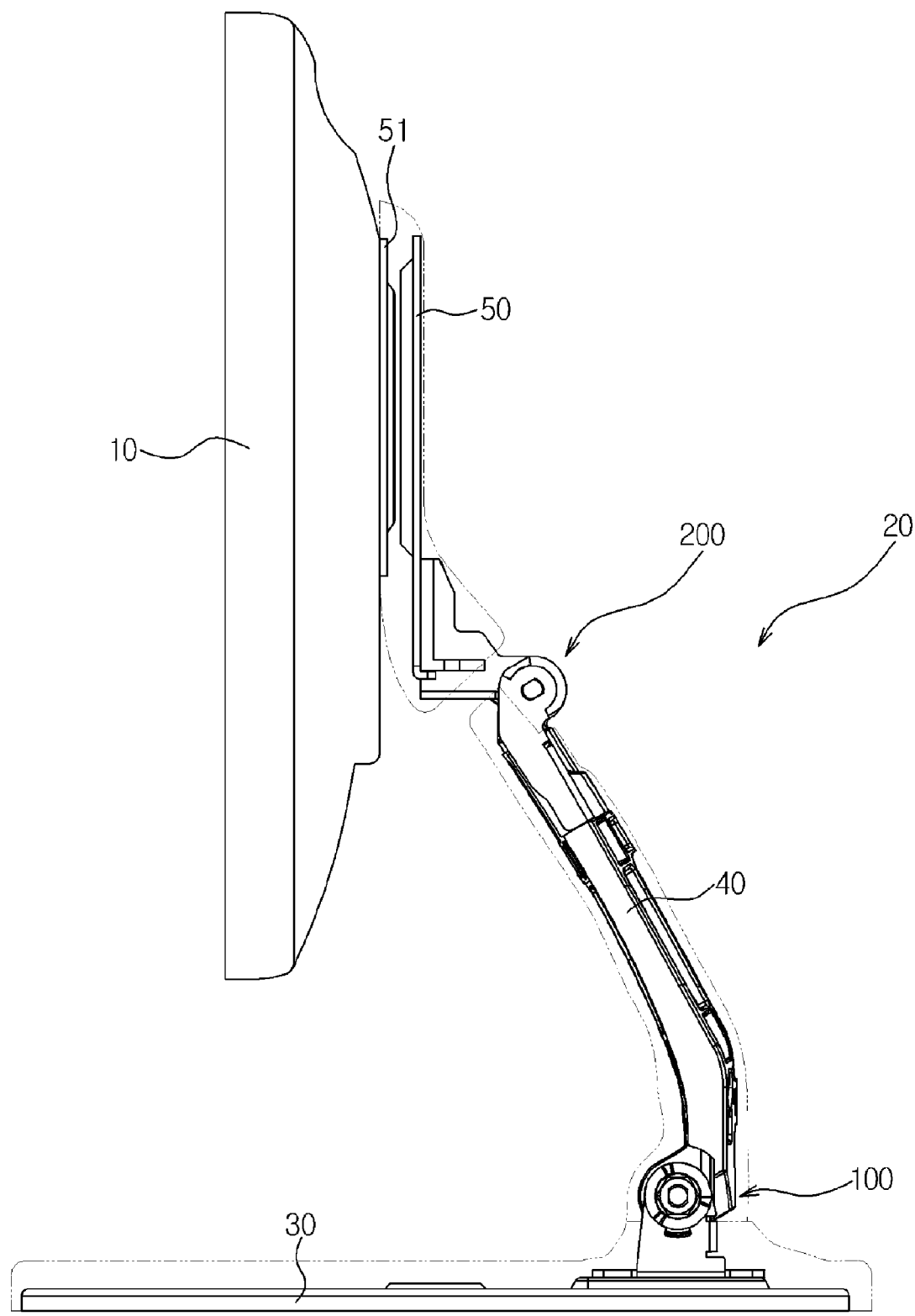
FIG. 1 is a side view illustrating an unfolded state of a supporting device for a display apparatus in accordance with the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

FIG. 1 illustrates an LCD monitor as one example of a display apparatus provided with a supporting device in accordance with the present invention. The display apparatus comprises a body 10 having a screen (not shown) mounted in a front surface thereof, and a supporting device 20 to support the body 10.

Figure 2:
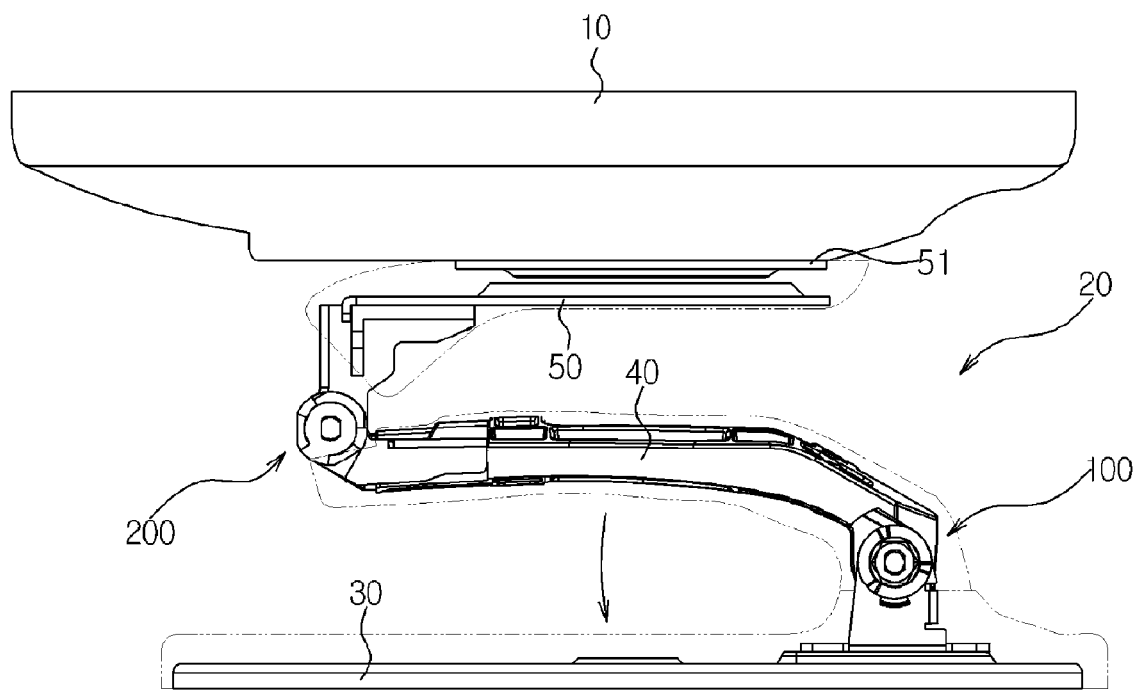
FIG. 2 is a side view illustrating a folded state of the supporting device of FIG. 1.
Figure 3:
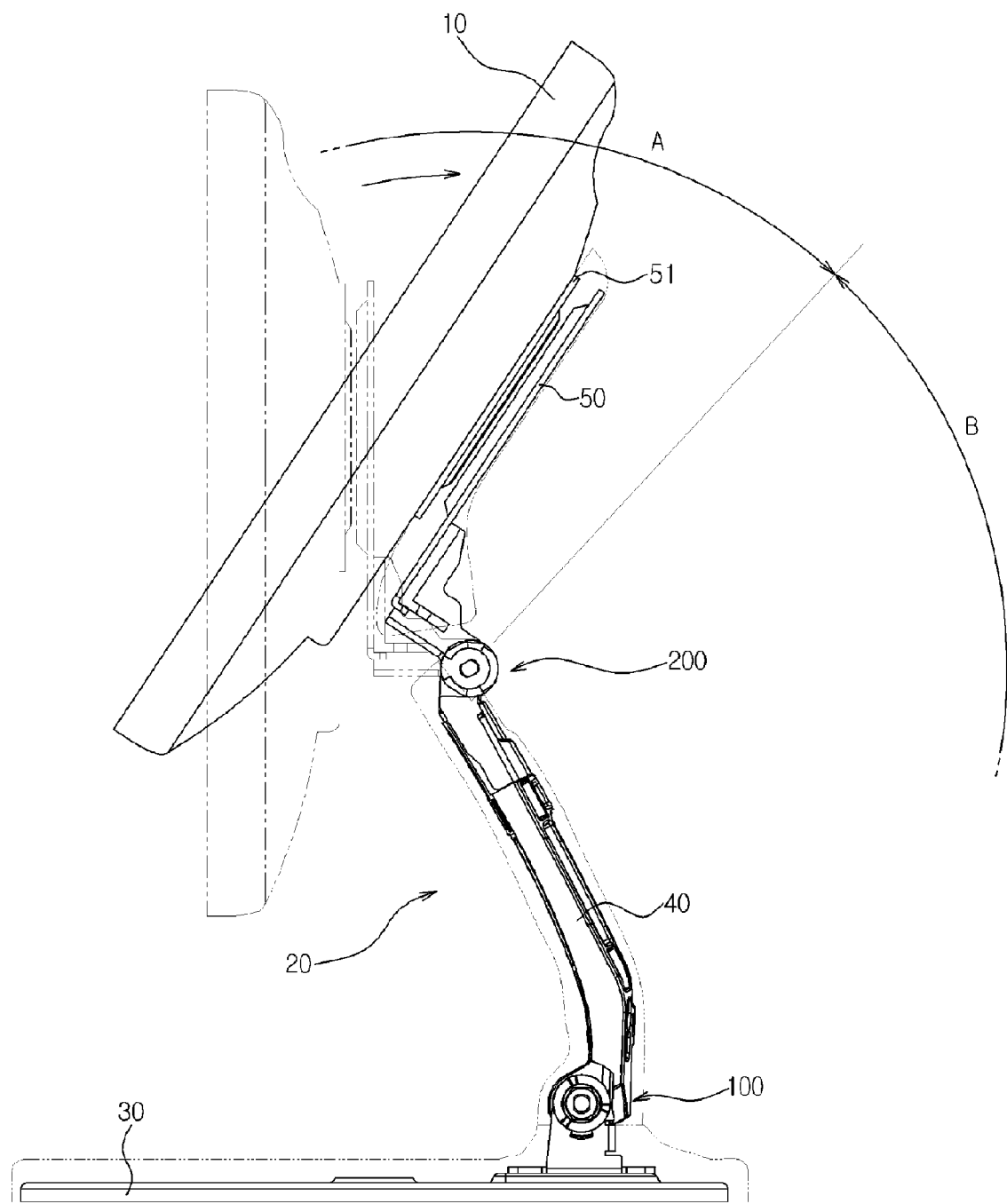
FIG. 3 is a side view illustrating the angle adjustment of a body screen included in the display apparatus in accordance with the present invention.

The supporting device 20 includes a flat-plate base 30 to be put on a desk or table for supporting the body 10, a supporting bracket 50 coupled to a rear surface of the body 10, and a stand 40 having a lower end portion coupled to the base 30 and an upper end portion coupled to the supporting bracket 50. To fold the supporting device 20 as shown in FIG. 2 when it is desired, for example, to package the display apparatus, or to rotate the body 10 forward or rearward for the adjustment of a screen tilting angle as shown in FIG. 3, the supporting device 20 further includes a lower connector mechanism 100 to rotatably connect the base 30 to the lower end portion of the stand 40, and an upper connector mechanism 200 to rotatably connect the supporting bracket 50 to the upper end portion of the stand 40.

Figure 4:
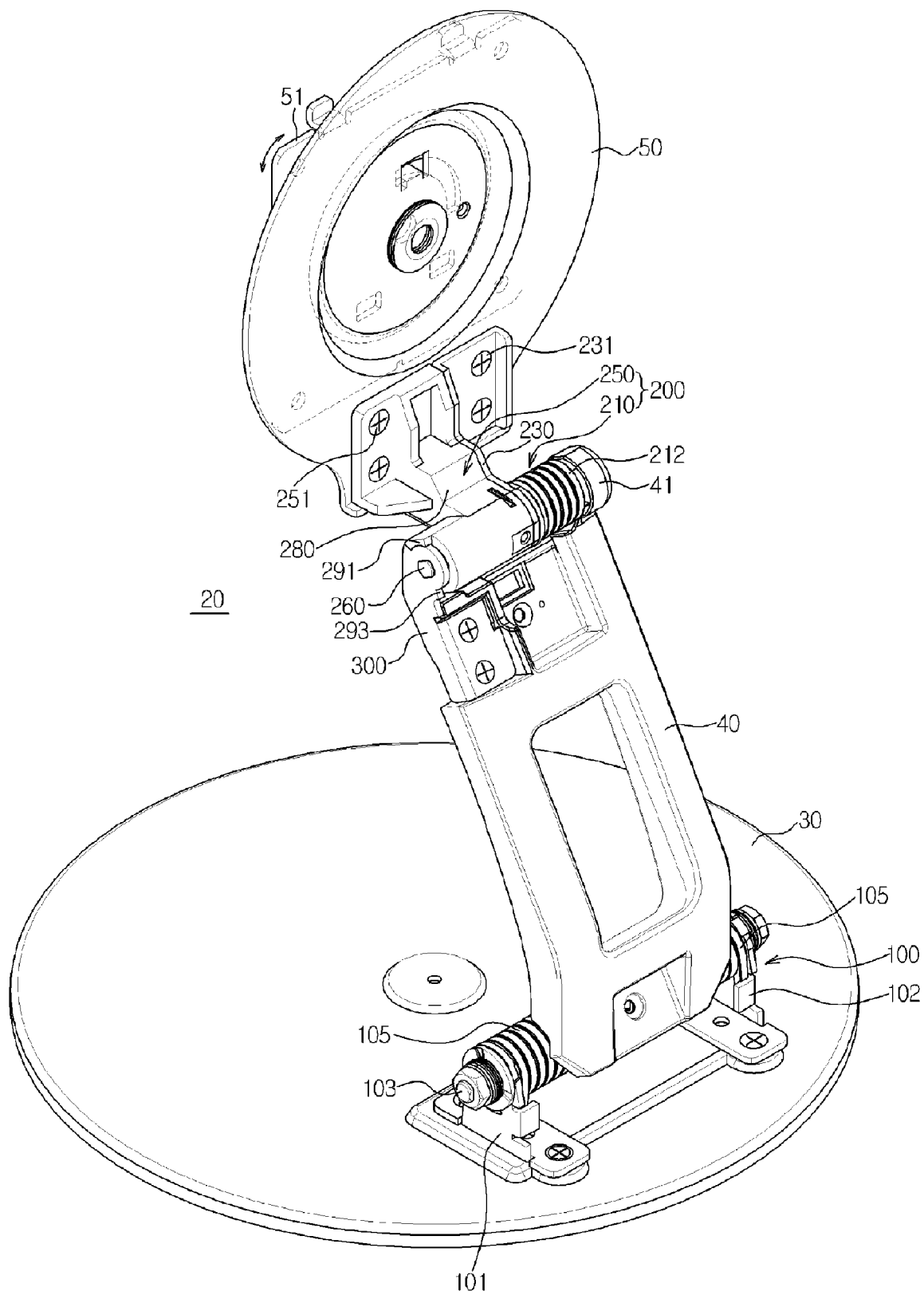
FIG. 4 is a perspective view of the supporting device for the display apparatus in accordance with the present invention.

The supporting bracket 50, as shown in FIG. 4, includes a pivot bracket 51 rotatably coupled to a front surface thereof. The pivot bracket 51 is coupled to the rear surface of the body 10, to rotate the screen of the body 10 so as to allow the screen to be oriented in a horizontal direction or vertical direction. Although the present embodiment illustrates the supporting bracket 50 having the pivot bracket 51, the supporting bracket 50 may be configured to have no pivot bracket 51.

The lower connector mechanism 100 to connect the lower end portion of the stand 40 to the base 30, as shown in FIG. 4, includes fixing brackets 101 and 102 mounted on an upper surface of the base 30 with a distance therebetween, and at least one hinge shaft 103 to rotatably connect the fixing brackets 101 and 102 to the lower end portion of the stand 40. The hinge shaft 103 is inserted through both the fixing brackets 101 and 102 by a nut-fastening method. The lower connector mechanism 100 further includes at least one torsion spring 105 installed around the outer surface of the hinge shaft 103, and a frictional structure (not shown) provided at a connecting region between the hinge shaft 103 and the stand 40, to provide the connecting region with a frictional force. Even if a rotating force acts on the lower connector mechanism 100 by the weight of the body 10, the torsion spring 105 can compensate for the rotating force by elasticity thereof, thereby guaranteeing a smooth rotating motion of the stand 40. Also, after the stand 40 is rotated forward or rearward to adjust the angle thereof, the adjusted angle of the stand 40 can be kept by a frictional force of the frictional structure.

Figure 5:
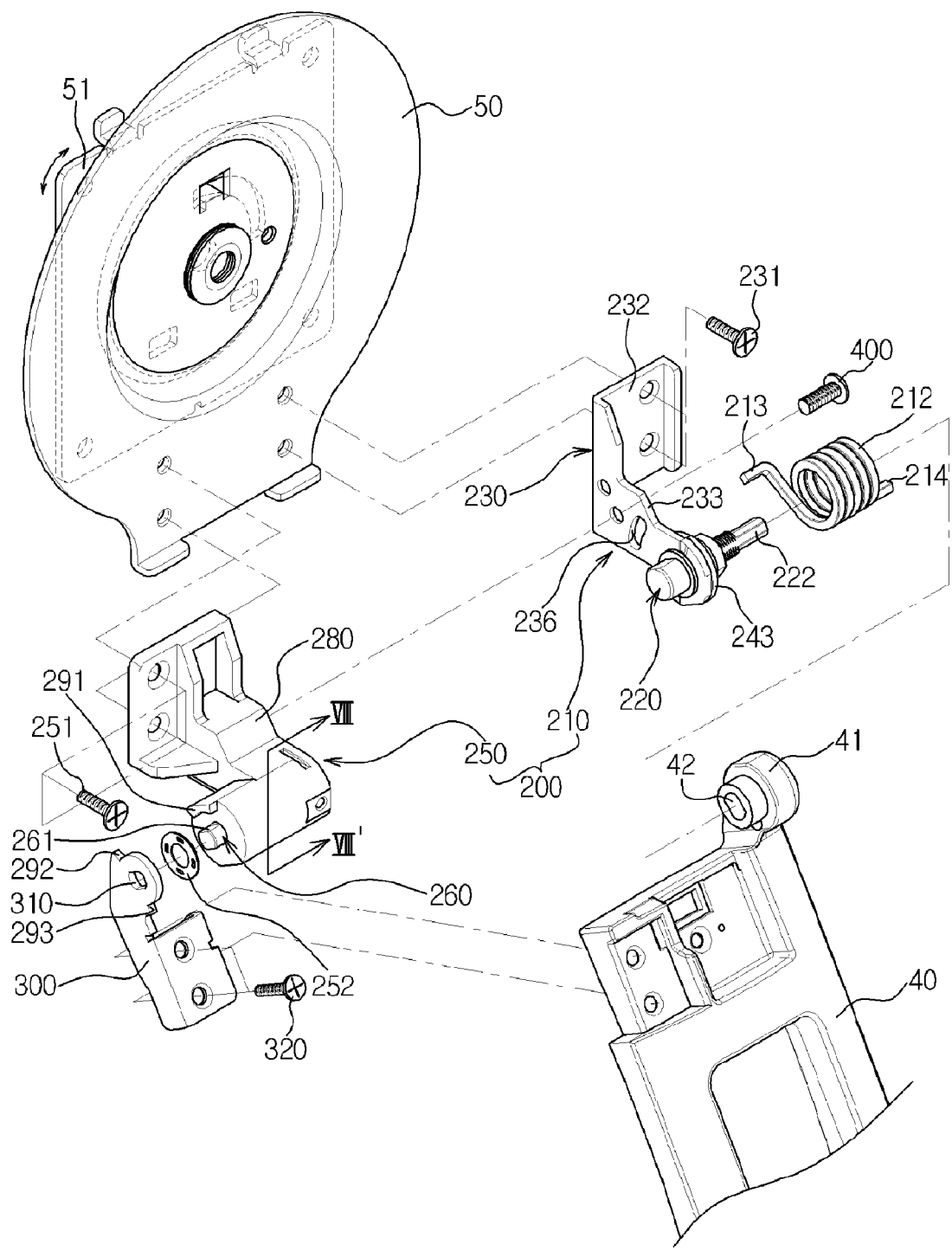
FIG. 5 is an exploded perspective view of an upper connector mechanism included in the supporting device for the display apparatus in accordance with the present invention.

The upper connector mechanism 200, which connects the upper end portion of the stand 40 to the supporting bracket 50, as shown in FIGS. 4 and 5, includes first and second connecting units 210 and 250 to rotatably connect the upper end portion of the stand 40 to the supporting bracket 50, and a fixing bracket 300 to install the second connecting unit 250 to the stand 40. The first and second connecting units 210 and 250 are provided as separate assemblies and can be sequentially assembled to each other, to facilitate connecting between the supporting bracket 50 and the upper end portion of the stand 40.

Figure 6:
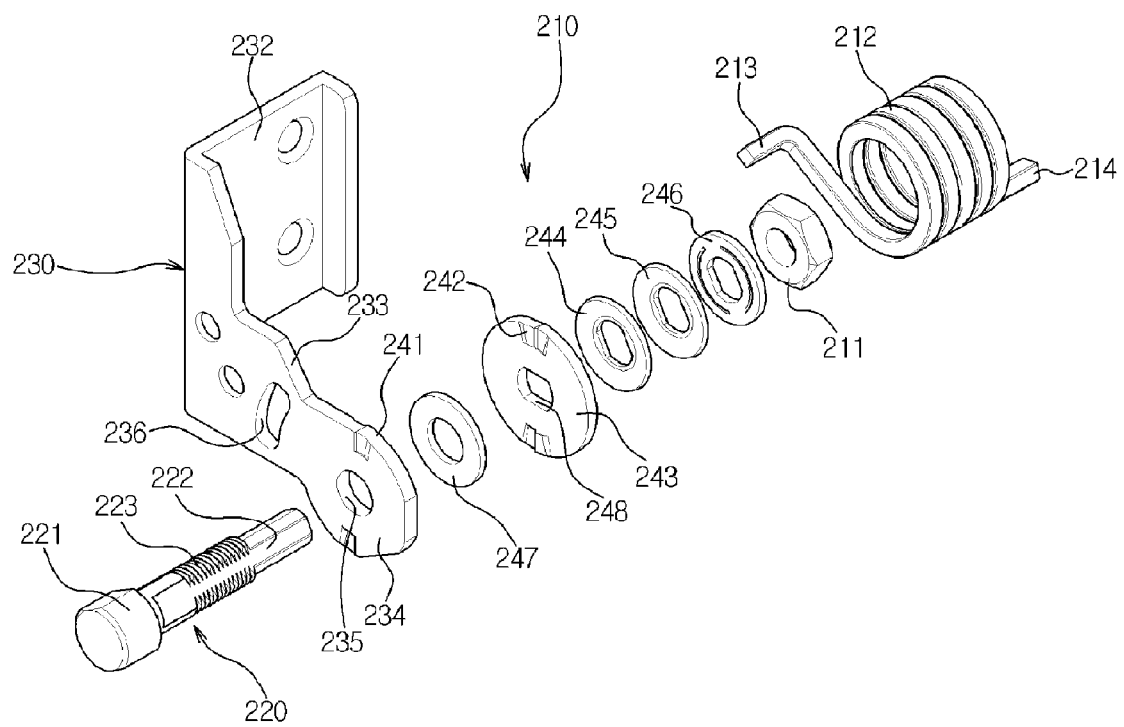
FIG. 6 is an exploded perspective view of a first connecting unit included in the upper connector mechanism of FIG. 5.

The first connecting unit 210, as shown in FIGS. 5 and 6, includes a first hinge shaft 220 coupled, in a rotation-limited state, to the upper end portion of the stand 40, and a first connecting member 230 having one side rotatably coupled with the first hinge shaft 220 and the other side fixed to the supporting bracket 50. The first connecting member 230 has a fixing portion 232 fixed to the supporting bracket 50 by fastening fixing screws 231, an extended portion 233 extended from the fixing portion 232 at a right angle, and a shaft coupling portion 234 having a shaft coupling hole 235 for the coupling of the first hinge shaft 220. The first hinge shaft 220 has a head portion 221 formed at one end thereof to prevent separation of the first connecting member 230, a non-circular sectional portion 222 to allow the first hinge shaft 220 to be coupled, in a rotation-limited state, to the upper end portion of the stand 40, and a screw portion 223 for the coupling of a fastening nut 211.

The first connecting unit 210 further includes a retainer structure to divide the rotation range of the body 10 relative to the stand 40 into a screen angle adjusting range A and a folding range B, as shown in FIG. 3. The screen angle adjusting range A is a range in which the body 10 is rotated manually to adjust the forward or rearward titling angle of the screen during the use of the display apparatus. The folding range B is a range in which the body 10 is manually further rotated rearward to fold the supporting device 20 as shown in FIG. 2 when it is desired, for example, to package the display apparatus. In the course of being manually rotated rearward, the body 10 will be slightly caught by the retainer structure at a boundary between the screen angle adjusting range A and the folding range B and therefore, the retainer structure serves to separate the screen angle adjusting range A and the folding range B from each other.

For this, the retainer structure, as shown in FIG. 6, includes a first protrusion 241 formed at a side surface of the shaft coupling portion 234 of the first connecting member 230, a retaining plate 243 coupled, in a rotation-limited state, around the outer surface of the first hinge shaft 220 and having a second protrusion 242 at a position corresponding to the first protrusion 241, a plurality of spring washers 244, 245 and 246 coupled around the outer surface of the first hinge shaft 220, to force the retaining plate 243 to be in close contact with the first connecting member 230, and the fastening nut 211. A washer 247 may be additionally installed between the first connecting member 230 and the retaining plate 243, to adjust a gap therebetween. The retaining plate 243 is centrally perforated with a non-circular shaft coupling hole 248. Accordingly, as the non-circular sectional portion 222 of the first hinge shaft 220 is inserted into the shaft coupling hole 248 of the retaining plate 243, a rotating motion of the retaining plate 243 relative to the first hinge shaft 220 is limited.

To assemble the first connecting unit 210, as shown in FIG. 6, after the first connecting member 230, the washer 247, the retaining plate 243, the plurality of spring washers 244, 245 and 246 are sequentially fitted around the outer surface of the first hinge shaft 220, the fastening nut 211 is fastened. In this way, the first connecting unit 210 takes the form of a single assembly as shown in FIG. 5.

With the above described configuration, when the body 10 is rotated relative to the stand 40, the second protrusion 242 of the retaining plate 241 is kept in a stationary state and the corresponding first protrusion 241 is rotated together with the first connecting member 230. Thereby, the first protrusion 241 can be caught by the second protrusion 242 in the course of adjusting the angle of the screen. Specifically, the first protrusion 241 can be caught by the second protrusion 242 at the boundary between the screen angle adjusting range A and the folding range B. Then, the body 10 is further rotated rearward by a bit of force in a state wherein the first protrusion 241 is caught by the second protrusion 242 in the course of rotating the body 10 rearward from a position within the screen angle adjusting range A of FIG. 3, the first protrusion 241 can pass over the second protrusion 242 and be rotated into the folding range B of FIG. 3. As the first protrusion 241 is further rotated in the folding range B, the first protrusion 241 is again caught by the second protrusion 242, so as to keep the supporting device 20 in a folded state.

To facilitate the above described operation, it is important to adjust a gap between the first connecting member 230 having the first protrusion 241 and the retaining plate 243 having the second protrusion 242. For this, in the present invention, the first connecting unit 210, which was previously assembled as shown in FIG. 5, is used to connect the stand 40 to the supporting bracket 50, therefore the gap between the first connecting member 230 and the retaining plate 243 can be maintained accurately.

As shown in FIG. 5, the stand 40 is provided, at one side of the upper end portion thereof, with a shaft coupling portion 41 having a non-circular shaft coupling hole 42 such that the first hinge shaft 220 of the first connecting unit 210 can be inserted, in a rotation-limited state, into the non-circular shaft coupling hole 42. The first connecting unit 210 is installed, on the outer surface of the first hinge shaft 220, with a torsion spring 212. The torsion spring 212 has one end 213 coupled into a spring coupling hole 236 of the first connecting member 230 and the other end 214 coupled into the shaft coupling portion 41 of the stand 40. In the course that the body 10 is rotated forward or rearward to adjust the angle of the screen, the torsion spring 212 serves to compensate for a rotating force of the first connecting member 230 caused by the weight of the body 10, thereby facilitating the angle adjustment of the screen of the body 10. That is, if the center of gravity of the body 10 is displaced forward or rearward and consequently, the body 10 is forced to be rotated in the same direction, the torsion spring 212 imparts an elastic force to rotate the body in an opposite direction, to thereby compensate for the rotation of the body 10.

Figure 7:
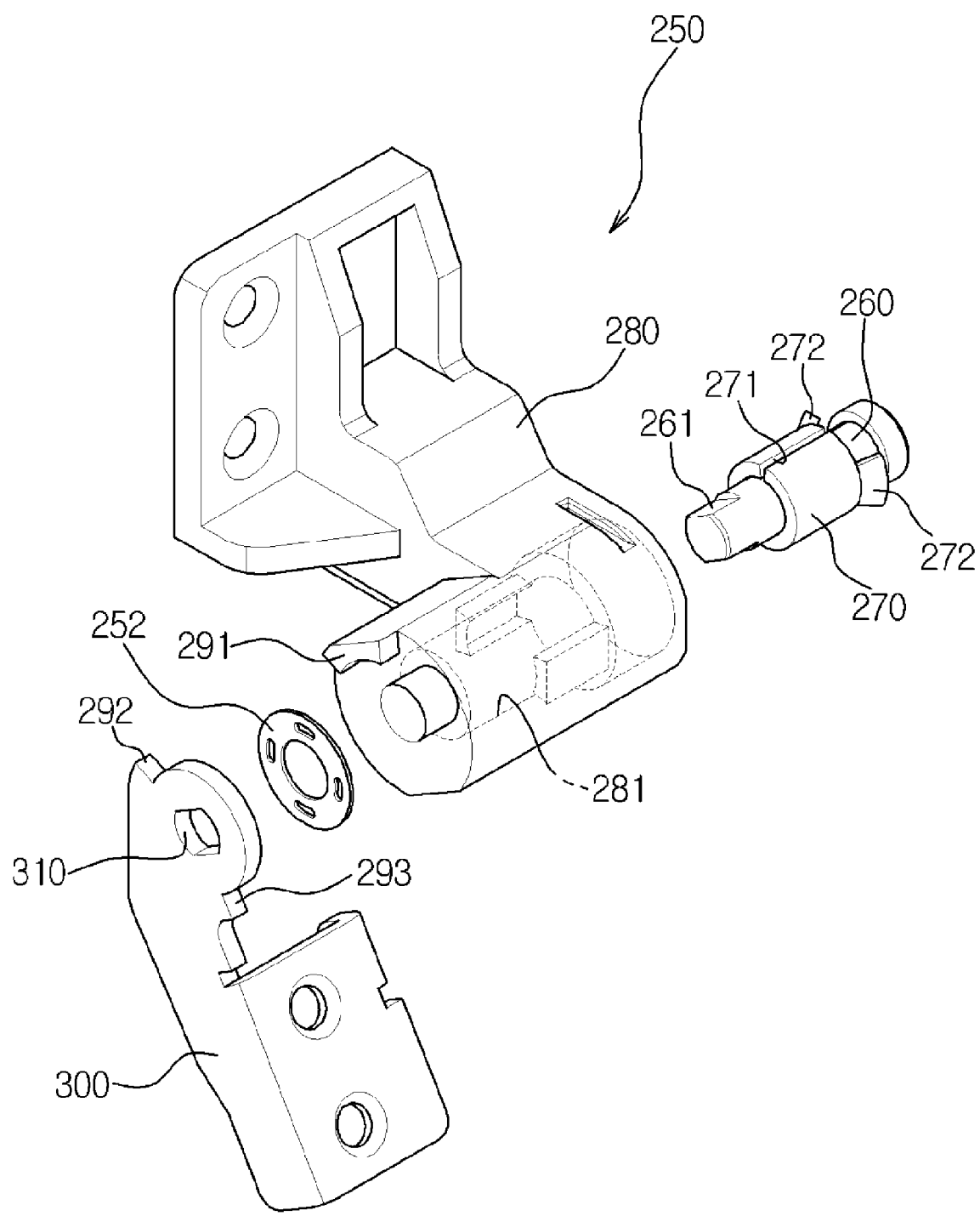
FIG. 7 is an exploded perspective view of a second connecting unit included in the upper connector mechanism of FIG. 5.
Figure 8:
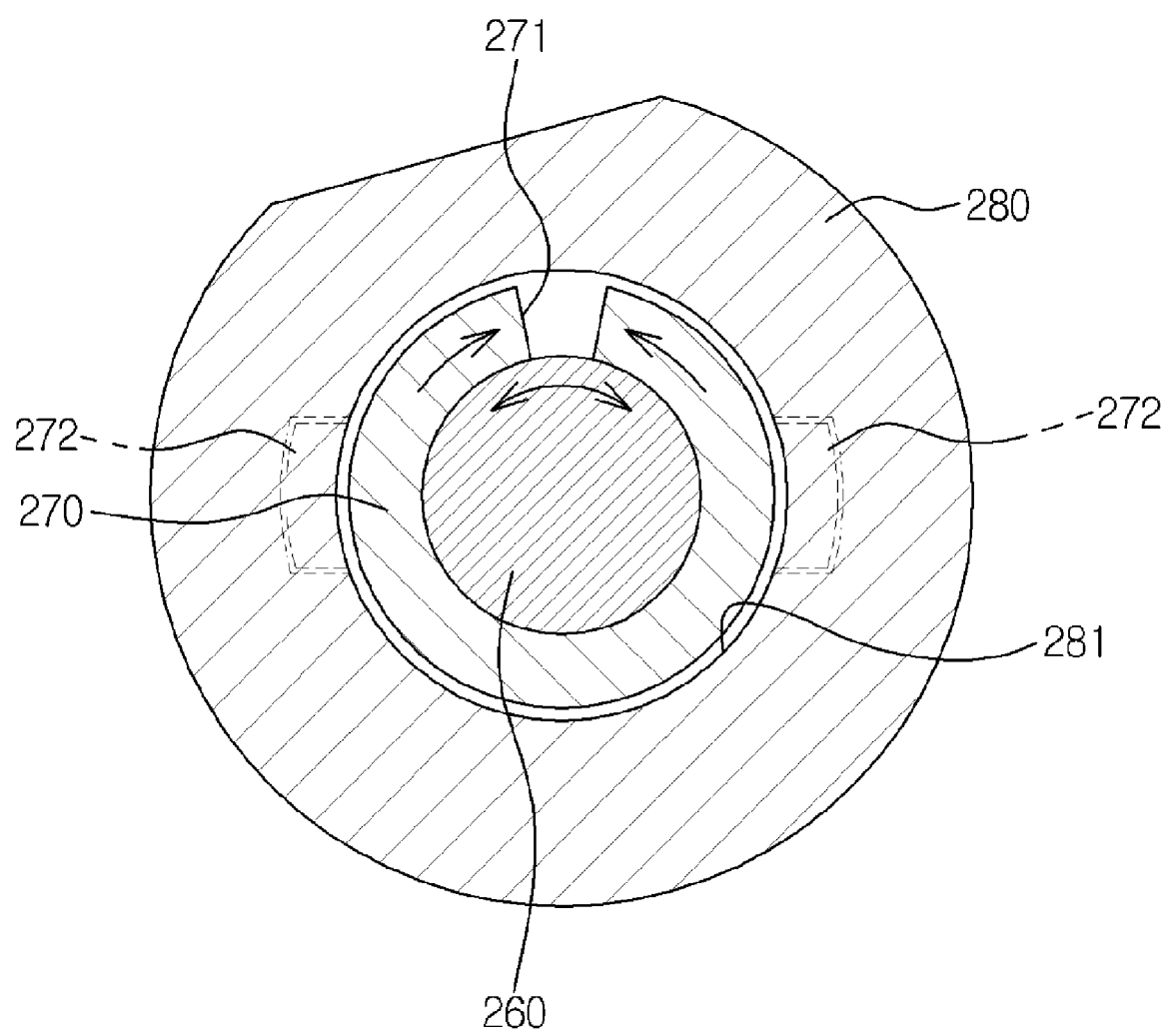
FIG. 8 is a sectional view taken along the line VIII-VIII' of FIG. 5.

The second connecting unit 250, as shown in FIGS. 5 and 7, includes a second hinge shaft 260 coupled, in a rotation-limited state, to the fixing bracket 300, and a second connecting member 280 having one side rotatably coupled to the second hinge shaft 260 and the other side fixed to the supporting bracket 50 by fastening fixing screws 251. The second connecting unit 250 further includes a frictional structure to provide a rotation-coupling region between the second hinge shaft 260 and the second connecting member 280 with a frictional force. The frictional structure, as shown in FIGS. 7 and 8, includes a cylindrical frictional member 270 coupled around the outer surface of the second hinge shaft 260, the cylindrical frictional member 270 having a longitudinal incision 271. The frictional member 270 has elasticity such that an inner surface of the frictional member 270 surrounds and tightens the outer surface of the second hinge shaft 260. The frictional member 270 has a pair of holding pieces 272 formed at opposite circumferential positions thereof. As the holding pieces 272 are caught by the inner surface of the second connecting member 280 so as to be kept at fixed positions, the rotation of the frictional member 270 relative to the second connecting member 280 is limited. The second connecting member 280 internally defines a hollow 281 for the penetration of the second hinge shaft 260 and the seating of the frictional member 270.

The second hinge shaft 260 has a non-circular sectional portion 261 formed at a portion thereof to be coupled into the fixing bracket 300. The fixing bracket 300 has a non-circular shaft coupling hole 310 for the coupling of the second hinge shaft 260. Accordingly, the second hinge shaft 260 can be coupled, in a rotation-limited state, to the fixing bracket 300. A washer 252 may be selectively interposed between the second connecting member 280 and the fixing bracket 300, to reduce, for example, the wear of a coupling region between the second connecting member 280 and the fixing bracket 300.

In cooperation with the previously described first connecting unit 210, the second connecting unit 250, having the above described configuration, can rotatably connect the stand 40 to the supporting bracket 50 and also, impart a frictional force to the rotation-coupling region by means of the frictional member 270. With the provision of the frictional force, after the body 10 is rotated forward or rearward to adjust the angle of the screen, the body 10 can be kept at the adjusted state.

The second connecting member 280 and the fixing bracket 300 are provided with a rotation-limit structure to allow the supporting bracket 50 to be rotated relative to the stand 40 only within a predetermined range. The rotation-limit structure, as shown in FIG. 7, includes a holding piece 291 protruding from the second connecting member 280 toward the fixing bracket 300, a first stepped supporting portion 292 formed at a circumferential position of the fixing bracket 300 to limit the rotation range of the holding piece 291 in a first direction, and a second stepped supporting portion 293 formed at an opposite circumferential position of the fixing bracket 300 to limit the rotation range of the holding piece 291 in a second direction. With this configuration, when the body 10 is rotated forward, the forward rotation of the body 10 can be limited as the holding piece 291 is caught by the first stepped supporting portion 292. Also, when the body 10 is rotated rearward, the rearward rotation of the body 10 can be limited as the holding piece 291 is caught by the second stepped supporting portion 293.

Hereinafter, a method (i.e. assembling method) for connecting the stand 40 to the supporting bracket 50 by use of the above described upper connector mechanism 200 will be described.

Referring to FIG. 5, to connect the stand 40 to the supporting bracket 50, first, the torsion spring 212 is disposed around the outer surface of the first hinge shaft 220 of the first connecting unit 210. Then, the first hinge shaft 220 is coupled into the shaft coupling portion 41 provided at the upper end portion of the stand 40. In sequence, the first connecting member 230 is fixed to the supporting bracket 50 by fastening the fixing screws 231 into the first connecting member 230. Thereafter, the second connecting unit 250 is installed.

To install the second connecting unit 250, in a state wherein the second hinge shaft 260, which was previously coupled with the frictional member 270, is mounted to the second connecting member 280, the second connecting member 280 is fixed to the supporting bracket 50 by fastening the fixing screws 251. Then, after inserting the washer 252 and the fixing bracket 300 around the second hinge shaft 260, the fixing bracket 300 is fixed to the stand 40 by fastening the fixing screws 320. Finally, the first connecting unit 210 and the second connecting unit 250 are coupled to each other by use of fastening screws 400. In this way, the coupling between the stand 40 and the supporting bracket 50 can be completed as shown in FIG. 4.

As apparent from the above description, the present invention provides a supporting device for a display apparatus, in which a connector mechanism for connecting the upper end portion of a stand to a supporting bracket includes first and second connecting units, and the first and second connecting units take the form of separate assemblies. With this configuration, the present invention has the effect of guaranteeing the easy assembling of the connector mechanism used to connect the upper end portion of the stand to the supporting bracket.

According to the present invention, the first connecting unit has a retainer structure, which includes a first protrusion of a first connecting member and a second protrusion of a retaining plate. The retainer structure of the present invention has a significantly simplified configuration as compared to the prior art.

Further, since the retainer structure is included in the first connecting unit provided as a separate assembly, even after completing the assembling of the supporting device, a gap between the first protrusion of the first connecting member and the second protrusion of the retaining plate can be kept accurately. That is to say, the present invention has the effect of eliminating the risk of a variation in the gap between the first and second protrusions even after the assembling of the supporting device.

Furthermore, when a body of the display apparatus is rotated rearward to fold the supporting device, the first protrusion can be rotated into a folding range by passing through the second protrusion, and consequently, the supporting device can be folded easily. Once the supporting device is folded, moreover, the first protrusion can be caught by the second protrusion, to keep the supporting device in the folded state.

Although the embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A supporting device for a display apparatus, comprising a supporting bracket coupled to the display apparatus, a base, a stand to connect the base to the supporting bracket, and a connector mechanism to rotatably connect the stand to the supporting bracket, wherein:

the connector mechanism comprises:

a first connecting unit to rotatably connect an upper end portion of the stand to the supporting bracket, the first connecting unit having a retainer structure to divide a rotation range of the display apparatus relative to the stand into a screen angle adjusting range and a folding range; and a second connecting unit to rotatably connect the upper end portion of the stand to the supporting bracket, the second connecting unit having a frictional structure to provide a rotation-coupling region thereof with a frictional force so that the display apparatus is held in position after being rotated; and wherein the first connecting unit and the second connecting unit are formed as separate assemblies; and wherein the screen angle adjusting range is a range in which the display apparatus is rotated manually to adjust a forward and rearward tilting angle of the display apparatus by the connector mechanism during use of the display apparatus, and the folding range is a range in which the display apparatus is manually further rotated rearward to fold the supporting device, and wherein the display apparatus is slightly caught by the retainer structure during rotation at the boundary between the screen angle adjusting range and the folding range.

2. The supporting device according to claim 1, wherein:

the first connecting unit comprises a first hinge shaft coupled, in a rotation-limited state, to the upper end portion of the stand and a first connecting member having a shaft coupling portion rotatably coupled to the first hinge shaft and a fixing portion fixed to the supporting bracket; and the retainer structure comprises a first protrusion protruding from a side surface of the shaft coupling portion of the first connecting member, a retaining plate coupled, in a rotation-limited state, around an outer surface of the first hinge shaft and having a second protrusion provided at a position corresponding to the first protrusion, and a fastening nut fastened around the outer surface of the first hinge shaft so as to force the retaining plate to be in close contact with the first connecting member.

3. The supporting device according to claim 2, wherein the retainer structure further comprises at least one spring washer coupled around the outer surface of the first hinge shaft between the fastening nut and the retaining plate.

4. The supporting device according to claim 2, wherein the first hinge shaft comprises a head portion formed at one end thereof for preventing separation of the first connecting member, and a non-circular sectional portion to limit rotation of the retaining plate with respect to the first hinge shaft.

5. The supporting device according to claim 4, wherein the stand comprises a shaft coupling portion provided at one side of the upper end portion of the stand for the coupling of the first hinge shaft thereto, the shaft coupling portion having a non-circular shaft coupling hole for receiving the non-circular sectional portion of the first hinge shaft therein.

6. The supporting device according to claim 2, wherein the first connecting unit further comprises a torsion spring installed around the outer surface of the first hinge shaft, the torsion spring having one end fixed to the upper end portion of the stand and an other end fitted into a spring coupling hole disposed on an extended portion of the first connecting member, the extended portion extending from the fixing portion at a right angle to the shaft coupling portion.

7. The supporting device according to claim 1, wherein:

the connector mechanism further comprises a fixing bracket detachably coupled to the upper end portion of the stand for the installation of the second connecting unit to the stand;

the second connecting unit comprises a second hinge shaft coupled, in a rotation-limited state, to the fixing bracket and a second connecting member having one side rotatably coupled to the second hinge shaft and the other side fixed to the supporting bracket; and the frictional structure comprises a cylindrical frictional member coupled around an outer surface of the second hinge shaft, the frictional member having elasticity to tighten the outer surface of the second hinge shaft and being coupled, in a rotation-limited state, to the second connecting member.

8. The supporting device according to claim 7, wherein:

the second hinge shaft has a non-circular sectional portion provided at a portion thereof to be coupled to the fixing bracket; and the fixing bracket has a non-circular shaft coupling hole for the coupling of the second hinge shaft thereto.

9. The supporting device according to claim 7, wherein:

the connector mechanism further comprises a rotation-limit structure to limit a rotation range of the second connecting member relative to the fixing bracket; and the rotation-limit structure comprises a holding piece protruding from the second connecting member toward the fixed bracket, a first stepped supporting portion provided at a position of the fixing bracket to limit a rotation range of the holding piece in a first direction, and a second stepped supporting portion provided at an opposite position of the fixing bracket to limit a rotation range of the holding piece in a second direction.

10. The supporting device according to claim 1, wherein the connector mechanism further comprises fastening screws to connect the first connecting unit and the second connecting unit to each other.

11. A display apparatus comprising a body having a screen and a supporting device to support the body, wherein:

the supporting device comprises a supporting bracket coupled to the body, a base to support the body, a stand to connect the base to the supporting bracket, and a connector mechanism to rotatably connect the stand to the supporting bracket;

the connector mechanism comprises:

a first connecting unit to rotatably connect an upper end portion of the stand to the supporting bracket, the first connecting unit having a retainer structure to divide a rotation range of the display apparatus relative to the stand into a screen angle adjusting range and a folding range; and a second connecting unit to rotatably connect the upper end portion of the stand to the supporting bracket, the second connecting unit having a frictional structure to provide a rotation-coupling region thereof with a frictional force so that the display apparatus is held in position after being rotated; and wherein the first connecting unit and the second connecting unit are formed as separate assemblies; and wherein the screen angle adjusting range is a range in which the display apparatus is rotated manually to adjust a forward and rearward tilting angle of the display apparatus by the connector mechanism during use of the display apparatus, and the folding range is a range in which the display apparatus is manually further rotated rearward to fold the supporting device, and wherein the display apparatus is slightly caught by the retainer structure during rotation at the boundary between the screen angle adjusting range and the folding range.

12. The display apparatus according to claim 11, wherein:

the first connecting unit comprises a first hinge shaft coupled, in a rotation-limited state, to the upper end portion of the stand and a first connecting member having a shaft coupling portion rotatably coupled to the first hinge shaft and a fixing portion fixed to the supporting bracket; and the retainer structure comprises a first protrusion protruding from a side surface of the shaft coupling portion of the first connecting member, a retaining plate coupled, in a rotation-limited state, around an outer surface of the first hinge shaft and having a second protrusion provided at a position corresponding to the first protrusion, and a fastening nut fastened around the outer surface of the first hinge shaft so as to force the retaining plate to be in close contact with the first connecting member.

13. The display apparatus according to claim 12, wherein the retainer structure further comprises at least one spring washer coupled around the outer surface of the first hinge shaft between the fastening nut and the retaining plate.

14. The display apparatus according to claim 12, wherein the first hinge shaft comprises a head portion formed at one end thereof for preventing separation of the first connecting member, and a non-circular sectional portion to limit rotation of the retaining plate with respect to the first hinge shaft.

15. The display apparatus according to claim 14, wherein the stand comprises a shaft coupling portion provided at one side of the upper end portion of the stand for the coupling of the first hinge shaft thereto, the shaft coupling portion having a non-circular shaft coupling hole for receiving the non-circular sectional portion of the first hinge shaft therein.

16. The display apparatus according to claim 12, wherein the first connecting unit further comprises a torsion spring installed around the outer surface of the first hinge shaft, the torsion spring having one end fixed to the upper end portion of the stand and an other end fitted into a spring coupling hole disposed on an extended portion of the first connecting member, the extended portion extending from the fixing portion at a right angle to the shaft coupling portion.

17. The display apparatus according to claim 11, wherein:
the display apparatus further comprises a fixing bracket detachably coupled to the upper end portion of the stand for the installation of the second connecting unit to the stand;
the second connecting unit comprises a second hinge shaft coupled, in a rotation-limited state, to the fixing bracket and a second connecting member having one side rotatably coupled to the second hinge shaft and the other side fixed to the supporting bracket; and
the frictional structure comprises a cylindrical frictional member coupled around an outer surface of the second hinge shaft, the frictional member having elasticity to tighten the outer surface of the second hinge shaft and being coupled, in a rotation-limited state, to the second connecting member.

18. The display apparatus according to claim 17, wherein:
the second hinge shaft has a non-circular sectional portion provided at a portion thereof to be coupled to the fixing bracket; and
the fixing bracket has a non-circular shaft coupling hole for the coupling of the second hinge shaft thereto.

19. The display apparatus according to claim 17, wherein:
the connector mechanism further comprises a rotation-limit structure to limit a rotation range of the second connecting member relative to the fixing bracket; and
the rotation-limit structure comprises a holding piece protruding from the second connecting member toward the fixed bracket, a first stepped supporting portion provided at a position of the fixing bracket to limit a rotation range of the holding piece in a first direction, and a second stepped supporting portion provided at an opposite position of the fixing bracket to limit a rotation range of the holding piece in a second direction.

20. The display apparatus according to claim 11, wherein the display apparatus further comprises fastening screws to connect the first connecting unit and the second connecting unit to each other.

* * * * *